Nov. 4, 1958     W. ROTH     2,858,686
FLASH LAMP
Filed Sept. 21, 1956
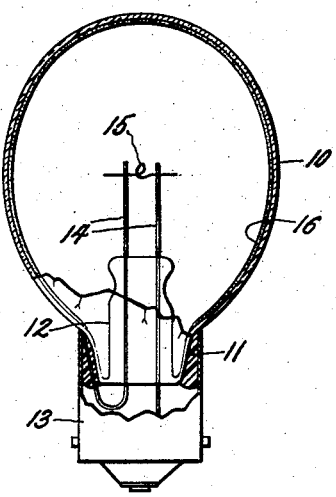
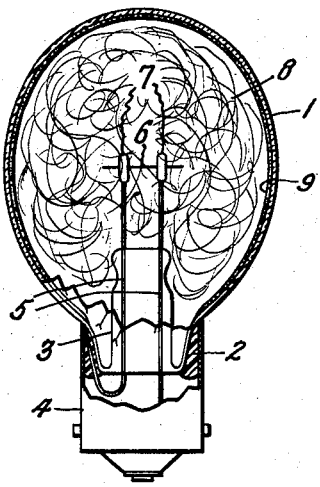
Inventor:
Walter Roth,
by Paul A. Frank
His Attorney.

United States Patent Office 2,858,686
Patented Nov. 4, 1958

2,858,686
FLASH LAMP

Walter Roth, Schenectady, N. Y., assignor to General Electric Company, a corporation of New York Application September 21, 1956, Serial No. 611,292

9 Claims. (Cl. 67—31)

The present invention relates to light sources wherein visible light is generated by energy transitions within an excited gaseous substance. More particularly the invention relates to improved photoflash lamps.

The photoflash lamps to which the present invention are applicable are of several types. Such lamps are chemical light sources in which visible light is produced by radiation from excited gaseous molecules, which molecules are originally excited or produced in excited states by chemical combustion. The starting materials from which the excited gaseous molecules are produced in the photoflash lamps of the invention may exist in various states. Thus, for example, the excited gaseous molecules may result from combustive reactions between two gases, or a gas and another non-gaseous, combustible material.

The common denominator of these diverse types of photoflash lamps lies in the mode by which light is emitted. In all of these light sources, atoms or molecules in the gaseous state are raised in energy by an external or internal energy supplying means. The energy states to which the gaseous molecules are raised are unstable, and, after a finite period of time, which is dictated by probability statistics, the excited molecules undergo an energy transition to a state of lower energy and, during this process, emit photons of visible light. There are, however, other processes by which excited atoms or molecules of a light emitting substance may return to an unexcited state without the emission of visible light. These processes are denominated as "non-radiative" transitions and compete with radiative transitions in the operation of the light sources involved. The problem of increasing the light output of the excited gaseous material light source involves, in part, increasing the probability of radiative transitions and decreasing the probability of non-radiative transitions.

Accordingly, one object of the invention is to provide excited gaseous light sources having increased brightness light output.

Another object of the invention is to provide excited gaseous light sources in which a greater percentage of the energy supplied thereto is converted into visible light.

A further object of the invention is to provide photoflash lamps having increased brightness and light conversion efficiency.

In accord with the broad concept of my invention, I provide excited gaseous photoflash lamps including an evacuable envelope containing therein a material which, upon combustion, is productive of electronically excited light emitting atoms or molecules which are also free radicals. The interior of the evacuable envelope is coated with a free radical reflecting substance, that is, a substance which is an inefficient adsorber of free radicals and which, therefore, reflects excited free radicals with no diminution of the energies thereof. The coating of free radical reflecting substance upon the interior of the photoflash lamp envelope prevents the excited unstable light emitting atoms or molecules from losing their energy in a non-radiative manner by collisions with the envelope wall.

This increases the probability of radiative transitions, and thus greatly increases the efficiency of conversion of electrical or chemical energy into visible light.

The novel features believed characteristic of the invention are set forth in the appended claims. Further objects and advantages thereof may best be understood with reference to the following detailed description taken in conjunction with the appended drawing in which:

Figure 1 represents a solid combustible material filled photoflash lamp embodying the invention.

Figure 2 represents a gas filled photoflash lamp embodying the invention.

Light emission from excited gases results from a change, or transition, of the atoms or molecules comprising the excited gas from a state of high energy to a state of lower energy. During the transition, a photon, equal to the difference in the two energy states is emitted. Such a transition is known as a "radiative transition." Changes in excited gas atoms or molecules are generally due to changes in the energy states of electrons associated with the atoms or molecules. The energy level of an electron in an atom or molecule can be completely specified by values given to a set of parameters known as quantum numbers. For an atomic electron the quantum numbers are. $n$—the principal quantum number; $l$—the orbital angular momentum quantum number; $m$—the azimuthal angular momentum quantum number; and $s$—the spin angular momentum quantum number. $n$ may be any integer; $l$ may have any integral value from 0 to $n-1$; $m$ may have any integral value from $+l$ to $-l$; $s$ may be either $+\frac{1}{2}$ or $-\frac{1}{2}$. The above possible values are determined by quantum mechanical selection rules.

The energy of an atom may be determined from the energy of all the electrons comprising the atom. The total energy of an atom, however, is defined by a "spectroscopic term value" which is derived from the quantum numbers of the electrons comprising the atom. Such a term value is $$n^M L_J$$

where $n=$the principal quantum number of the most loosely bound electrons comprising the atom
$M=$the "multiplicity" of the atomic state and equals $2S+1$
$S=$the absolute value of the vector sum of the individual spin quantum numbers of the constituent electrons
$L=$the vector sum of the individual $l$ quantum numbers of the electrons
$J=$the absolute value of the vector sum of L and S In the spectroscopic notation of term values, the value of L is given in capital letters, where the letters are S, P, D, F, G, . . . for $L=0, 1, 2, 3, 4$ . . . respectively.

The quantum number system is also applicable, and utilized, with respect to the energies of electrons comprising excited molecules. Likewise, term values are utilized to identify the energy states of excited molecules. In the molecular system, the quantum numbers are denominated $n$, $l$, $\lambda$, and $s$, and the term values take the form $n^M \Lambda$ where $\Lambda$ may be $\Sigma$, $\Pi$, $\Delta$, $\Phi$, $\Gamma$, etc. indicating values of 0, 1, 2, 3, 4, etc. respectively. In this system the multiplicity term M has the same significance as in the atomic system.

For the purpose of this invention, only the multiplicity term need be dealt with in detail. It has been noted hereinbefore that the multiplicity term M is derived from the spin quantum members of the electrons in an atom or molecule. It has further been noted that the spin quantum number of an electron may have a value of only $+\frac{1}{2}$ or $-\frac{1}{2}$. When an atom or molecule has electrons with paired spin quantum numbers, that is electron pairs whose spin quantum numbers are $+\frac{1}{2}$ and —½ respectively, the total spin quantum number of the atom or molecule is equal to zero and the multiplicity value is 1. Such an atomic or molecular state is referred to as a "singlet." When, on the other hand, an atom or molecule in a particular energy state possess unpaired electrons, the total spin quantum number S is not zero and the multiplicity term M is greater than one. Such an atomic or molecular state is referred to as a "multiplet"; and may be a doublet if $M=2$, a triplet state is $M=3$, etc.

Multiplet states of excited atoms or molecules are denominated as "free radicals." It follows then, that a free radical cannot be a singlet state of an excited atom or molecule. Free radicals of excited atoms or molecules are doublet, triplet or higher multiplet states. Some multiplet states of excited gaseous atoms with which the invention is concerned are the sulfur dioxide triplet $^3\Sigma$, the carbonyl sulfide (COS) triplet, $^3\Pi$, the gaseous diatomic sulfur triplet, $^3\Sigma$, and the aluminum monoxide doublet $^2\Sigma$. The invention, then, is concerned with excited gaseous photoflash lamps in which the light emitting, excited atom or molecule exists in a doublet, triplet or higher state.

A further characteristic of free radicals, which aids in distinguishing them from other atomic and molecular states, is that free radicals are paramagnetic. This characteristic is also due to the presence, in free radicals, of unpaired electrons. For a further discussion of free radicals and other examples thereof, reference is hereby made to page 472 and Table 39 of the text "Structure of Diatomic Molecules," by G. Herzberg, published by D. Van Nostrand Company, 1950. For a further reference to free radicals reference is also made to page 585 et seq. of the text "Organic Chemistry," by H. Gilman, 2nd edition, vol. I, published by John Wiley and Sons, New York, 1943.

I have discovered in the operation of excited gaseous photoflash lamps in which the excited, light emitting state of the gas is a free radical, that a substantial diminution of the efficiency of conversion of electrical or chemical energy into visible light occurs through non-radiative energy changes, or transitions, occurring due to the excited free radicals coming into contact with the walls of the envelope within which they are confined and losing their energy without radiation. This loss of energy is believed due to the fact that the excited free radicals present in the photoflash lamps of the invention are believed to be long-lifetime excited free radicals, that is, free radicals which exist for a relatively long period of time in their excited states before undergoing a radiative energy transition and emitting light. Due to this long lifetime the excited free radicals have a high probability of coming into contact with the envelope wall and thus losing their energies non-radiatively. This is to be contrasted with short-lifetime excited states which exist for only a short period of time and which have a low probability of reaching the wall of the envelope within which they may be enclosed before undergoing a radiative energy transition.

I have further discovered that the above described diminution of light output of excited gas photoflash lamps may be avoided by preventing non-radiative deexcitation of excited free radicals at the envelope wall. In accord with the invention, I accomplish this by coating the interior of the lamp envelope wall with an inorganic free radical reflecting substance. A free radical reflector, also known as non-chain breaking surface, is a surface having a low probability of adsorbing free radicals when contacted thereby.

Although the exact operation of free radical reflectors is not known, I have found that when an envelope containing excited light emitting free radicals is coated with a free radical reflecting substance, the free radicals are reflected therefrom without being deexcited. The free radicals are then free to undergo radiative transitions with an increase in light output.

In Figure 1 of the drawing, a photoflash lamp is constructed in accord with one feature of the invention as illustrated in a partially cross-sectioned view. The lamp of Figure 1 comprises an evacuable light-transmissive envelope or bulb 1 having a hollow neck portion 2 and a solid reentrant portion 3, contained therein. A base member 4 is cemented or otherwise suitably fastened to the periphery of neck portion 2. A pair of lead-wires 5 are connected to base 4 and extend through re-entrant portion 3 into the center of the closure defined by envelope 1. A high resistance electrically conducting filament 6 which may for example be a tungsten wire is connected across the interior ends of lead-wires 5. Beads 7, of a chemical primer charge, are located at the intersection of the filament with each of lead wires 5. A charge 8 of flocculent light emitting material which may be aluminum foil, wire or shreds, fills the central portion of bulb envelope 1 and surrounds filament 6 and primer beads 7. A free radical reflecting coating 9 is deposited upon the interior surface of bulb envelope 1 in the form of a thin, uniformly smooth layer. The interior of envelope 1 is filled to an appropriate pressure, for example, approximately 0.2 to 1 atmosphere, with oxygen or a suitable oxygenous gas. Higher gas pressure may be utilized but this range is preferred to minimize the probability of bulb fracture upon ignition.

Bulb envelope 1 may be constructed of glass, quartz or other suitable light-transmissive vitreous material. Primer beads 7 comprise any suitable mixture of an oxygen supplying material, such as potassium chlorate or potassium perchlorate, and a combustible substance such as zirconium or titanium. Free radical reflecting coating 9 may be any suitable free radical reflecting material. Conveniently, coating 9 may be an alkali chloride, potassium borate, boric acid, manganous chloride, barium chloride, sodium tungstate, a phosphoric acid, or any substance having a low probability for adsorption of free radicals. Preferably, however, coating 9 is composed of metaphosphoric acid or KCl. Although the above listed materials do not have a community of chemical properties, they are all free radical reflecting materials. As utilized herein a free radical reflecting material may be defined as an inorganic material which has a low probability for adsorption of free radicals, and which, therefore, reflects, upon collision therewith, excited gaseous light emitting free radicals without causing the free radicals to lose their energy of excitation by non-radiative energy transition.

In the operation of the lamp of Figure 1, an electric voltage is applied across filament 6 through lead wires 5. Filament 6 heats to incandescence and causes primer beads 7 to ignite. Primer beads 7, in turn, ignite the aluminum wire, foil, or shreds within the bulb. Since the interior of the bulb envelope 1 is filled to approximately 0.2 to 1 atmosphere pressure with oxygen or an oxygenous gas the aluminum within the bulb rapidly burns to form an excited gaseous mixture, an important light emitting substance of which is AlO. This light emitter exists in the $^2\Sigma$ energy state. As was shown hereinbefore, this light emitting excited gaseous molecule is a doublet and is a free radical. If it is allowed to come in contact with the bulb wall before it has made a radiative transition, with the consequent emission of light, it may lose its energy by non-radiative processes, and the efficiency of the bulb would be decreased. When, however, the interior of bulb 1 is coated with free radical reflecting coating 9, preferably comprised of metaphosphoric acid or KCl the free radicals of AlO are reflected therefrom without any energy loss, and the light conversion efficiency of the bulb is greatly enhanced.

In accord with another embodiment of the invention, the lamp of Figure 1 may be modified by omitting aluminum foil 8 therefrom, and constructing primer beads 7 of the hereinbefore described materials, but so large that the initial flash, in which zirconium or titanium combines with oxygen, generates all the excited gases which emit light in the operation of the bulb. In such an embodiment, the excited gaseous light emitting molecules or ZrO and TiO respectively, both of which exist as triplet excited states and, hence, both of which are free radicals. In the operation of such a photoflash lamp, the presence of free radical reflecting coating 9 upon the interior surface of bulb or envelope 1 greatly enhances the light output therefrom. In such an embodiment, any free radical reflecting coating may likewise be used, particularly the ones listed above, and preferably metaphosphoric acid or KCl.

In Figure 2 of the drawing there is illustrated in a partially sectional view, a gaseous photoflash lamp constructed in accord with another embodiment of the invention. The lamp of Figure 2 comprises a light-transmissive, evacuable bulb or envelope 10 having a base portion 11 and a solid re-entrant portion 12. Base member 13 is cemented or otherwise fastened to base portion 11 of bulb envelope 10. A pair of lead-in wires 14 are connected to base 13 and enter bulb 1 through re-entrant portion 12. The interior surface of bulb 10 is coated with a free radical reflecting coating 16 which may comprise for example any of the substances disclosed hereinbefore. A high resistance, electrically conductive filament 15 which may for example be a tungsten wire is connected between the interior ends of lead wires 14. The enclosure within envelope 10 is filled to a pressure of from approximately 5 to 100 centimeters of mercury with a mixture of one part carbon disulfide and two to four parts by volume of an oxide of nitrogen, preferably NO. The only practical upper limit upon the pressure utilized is that if more than 40 centimeters of $CS_2$ is present at room temperature some $CS_2$ will liquefy. Alternatively, filament 15 may be coated with an inorganic nitrate or nitrite salt which decomposes and releases one or more of the oxides of nitrogen (NO, $N_2O$ or $NO_2$) when the filament is heated to incandescence. If this structure is utilized, the atmosphere of the bulb need only contain carbon disulfide at a pressure of approximately 3 to 25 centimeters of mercury and need not include a nitrogen oxide. This latter structure, exclusive of the included free radical reflecting coating, is disclosed and claimed in my copending application Serial No. 552,837, filed December 13, 1955, and assigned to the present assignee, now Patent No. 2,791,897.

In the operation of the bulb of Figure 2 a voltage is applied to lead wires 14 and developed across electrically conductive, high resistance filament 15. The heating of filament 15, and subsequent fracture thereof, initiates a chemical reaction between the $CS_2$ originally present within the bulb and the oxide of nitrogen, either originally present within the bulb or released from a filament coating upon the decomposition thereof. The chemical reaction between the carbon disulfide and the nitrogen oxide is accompanied by a brilliant flash of light useful in flash photography.

I have discovered that the excited gaseous light emitting molecules responsible for the photographically useful light produced in the reaction between carbon disulfide and the oxides of nitrogen are the $SO_2$ molecule, which exists in the $^3\Sigma$ state, the COS molecule which exists in the $^3\Pi$ state, and the gaseous $S_2$ molecule, which exists in the $^3\Sigma$ state. All of these molecular states are triplets and are free radicals. The addition of free radical reflecting coating 16 to the bulb wall of this embodiment of the invention greatly increases the light output therefrom. While any free radical reflecting substance, for example, the hereinbefore listed materials may be utilized as coating 16, metaphosphoric acid and KCl have been found to give the best results in the operation of this embodiment. In numerous tests of light sources constructed in accord with this embodiment of the invention, the coating of the interior of the evacuable envelope with a thin film of metaphosphoric acid or KCl has been found to approximately double the intensity of visible light produced by this reaction.

In all of the foregoing disclosed embodiments of the invention the free radical reflecting coating need not be very thick. This coating may, for example, be from 1 to 200 microns thick, although greater thickness may be utilized without detracting from the operation of the lamp. It is only necessary that the thickness not be sufficiently great to impair the transparency of the envelope and thus lessen the light transmission thereof.

While the invention has been described with respect to particular embodiments thereof, it is apparent that many modifications and changes will immediately occur to those skilled in the art, without departing from the true spirit of the invention. Accordingly, by the appended claims I intend to cover all such modifications and changes as fall within the true spirit and scope of the foregoing disclosure.

What I claim as new and desire to secure by Letters Patent of the United States is:

1. A photoflash lamp comprising an evacuable light transmissive envelope, a charge of combustible material within said envelope which charge is productive of excited, light emitting gaseous free radicals when ignited, filament means within said envelope for igniting said charge, and a free radical reflecting coating upon the interior surface of said envelope.

2. A photoflash lamp comprising an evacuable light transmissive envelope, a high resistance electrically conducting filament within said envelope, a coating upon said filament of an inorganic salt productive of at least one gaseous oxide of nitrogen upon thermal decomposition thereof, a charge of carbon disulfide within said envelope, and a free radical reflecting coating upon the interior surface of said envelope.

3. A photoflash lamp comprising an evacuable light transmissive envelope, a high resistance electrically conducting filament within said envelope, a coating upon said filament of an inorganic salt productive of an oxide of nitrogen selected from the group consisting of $N_2O$, NO, and $NO_2$ upon chemical decomposition thereof, a charge of carbon disulfide within said envelope, and a free radical reflecting coating upon the interior surface of said envelope.

4. A photoflash lamp comprising an evacuable, light transmissive envelope, a light producing mixture within said envelope comprising carbon disulfide and at least one gaseous oxide of nitrogen, ignition means for initiating a chemical reaction between said gases, said reaction being productive excited of free radicals, and a free radical reflecting coating on the interior surface of said envelope.

5. A photoflash lamp comprising an evacuable, light transmissive envelope, a light producing mixture within said envelope comprising carbon disulfide and a gaseous oxide of nitrogen selected from the group consisting of $N_2O$, NO, and $NO_2$, ignition means for igniting a chemical reaction between said gases, said reaction being productive of excited free radicals, and a free radical reflecting coating on the interior surface of said envelope.

6. A photoflash lamp comprising an evacuable light transmissive envelope, a flocculent mass of aluminum and a charge of a combustion-supporting oxygenous gas within said envelope, means for initiating a chemical reaction between said aluminum and said oxygenous gas, said reaction being productive of excited free radicals, and a free radical reflecting film upon the interior surface of said envelope.

7. The photoflash lamp of claim 3 wherein the free radical reflecting coating is a material selected from the group consisting of metaphosphoric acid and KCl.

8. The photoflash lamp of claim 5 wherein the free radical reflecting coating is a material selected from the group consisting of metaphosphoric acid and KCl.

9. The photoflash lamp of claim 6 wherein the free radical reflecting film is a material selected from the group consisting of metaphosphoric acid and KCl.

References Cited in the file of this patent

UNITED STATES PATENTS

| | | |
|---|---|---|
| 1,944,854 | Van Liempt | Jan. 23, 1934 |
| 1,989,572 | Van Liempt | Jan. 29, 1935 |
| 2,013,371 | Van Liempt | Sept. 3, 1935 |
| 2,305,609 | Eaton | Dec. 22, 1942 |